US012560053B2

(12) United States Patent
Patil et al.

(10) Patent No.: US 12,560,053 B2
(45) Date of Patent: Feb. 24, 2026

(54) LOST CIRCULATION MITIGATION USING MINERALIZATION OF CO₂ IN THE SUBSURFACE

(71) Applicant: SAUDI ARABIAN OIL COMPANY, Dhahran (SA)

(72) Inventors: Pramod Dhanaji Patil, Sugar Land, TX (US); Abdulaziz S. Al-Qasim, Dammam (SA); Ali A. Yousef, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 107 days.

(21) Appl. No.: 18/407,847

(22) Filed: Jan. 9, 2024

(65) Prior Publication Data

US 2025/0223888 A1    Jul. 10, 2025

(51) Int. Cl.
*E21B 41/00* (2006.01)
*C09K 8/52* (2006.01)

(52) U.S. Cl.
CPC ............ *E21B 41/0064* (2013.01); *C09K 8/52* (2013.01)

(58) Field of Classification Search
CPC .............................. E21B 41/0064; C09K 8/52
See application file for complete search history.

(56) References Cited

U.S. PATENT DOCUMENTS

| | | | |
|---|---|---|---|
| 4,844,164 A | 7/1989 | Shen | |
| 7,090,013 B2 * | 8/2006 | Wellington | ......... E21B 41/0064 |
| | | | 208/213 |
| 7,866,389 B2 * | 1/2011 | De Francesco | ......... E21B 43/16 |
| | | | 166/57 |

(Continued)

FOREIGN PATENT DOCUMENTS

| | | | | |
|---|---|---|---|---|
| AU | 2012272496 A1 * | 1/2014 | ......... | E21B 41/0064 |
| BR | 112013007117 B1 * | 8/2020 | ......... | E21B 41/0064 |

(Continued)

OTHER PUBLICATIONS

International Search Report issued for corresponding international patent application No. PCT/US2025/010527, mailed Mar. 24, 2025 (6 pages).

(Continued)

*Primary Examiner* — Frederick L Lagman
(74) *Attorney, Agent, or Firm* — Osha Bergman Watanabe & Burton LLP

(57) ABSTRACT

Methods and compositions for carbon dioxide (CO₂) sequestration in a wellbore. A method includes locating a lost circulation zone in the wellbore during drilling. Methods may further include flushing drilling mud from the wellbore to prepare the lost circulation zone for lost circulation mitigation and injecting a cleaning solution into the wellbore. Then, injecting a composition for CO₂ sequestration into the wellbore, where the composition may include a brine solution, an alkali and/or an alkaline compound, and a catalyst. The method may further include injecting a volume of CO₂ into the wellbore, mineralizing the alkali and/or the alkaline compound and the volume of CO₂ to produce an alkali and/or alkaline carbonate compound, injecting drilling mud into the wellbore and resuming drilling operations.

16 Claims, 3 Drawing Sheets

(56) References Cited

U.S. PATENT DOCUMENTS

| | | | | |
|---|---|---|---|---|
| 8,431,100 | B2 | 4/2013 | Constantz et al. | |
| 8,899,331 | B2 | 12/2014 | Burnham et al. | |
| 8,952,127 | B2 | 2/2015 | Chen et al. | |
| 9,475,000 | B2 | 10/2016 | Benyahia | |
| 12,152,469 | B1 * | 11/2024 | Patil | E21B 41/0064 |
| 2013/0045514 | A1 | 2/2013 | Barbero et al. | |
| 2023/0041084 | A1 | 2/2023 | Smith | |
| 2023/0050823 | A1 | 2/2023 | Darrah et al. | |
| 2024/0191591 | A1 * | 6/2024 | Sonat | E21B 41/0064 |

FOREIGN PATENT DOCUMENTS

| | | | |
|---|---|---|---|
| CN | 102491795 | B | 2/2013 |
| CN | 108377650 | A | 8/2018 |
| CN | 115405255 | A | 11/2022 |
| CN | 114163982 | B | 12/2022 |
| CN | 113494265 | B | 5/2023 |
| WO | 2018/064320 | A1 | 4/2018 |

OTHER PUBLICATIONS

Written Opinion issued for corresponding international patent application No. PCT/US2025/010527, mailed Mar. 24, 2025 (8 pages).
N. Zhang, et al., "Acceleration of CO2 mineralisation of alkaline brines with nickel nanoparticles catalysts in continuous tubular reactor," Chemical Engineering Journal, 2019 (11 pages).
J. Mustafa, et al., "Simultaneous treatment of reject brine and capture of carbon dioxide: A comprehensive review," Desalination, 2020 (22 pages).

* cited by examiner

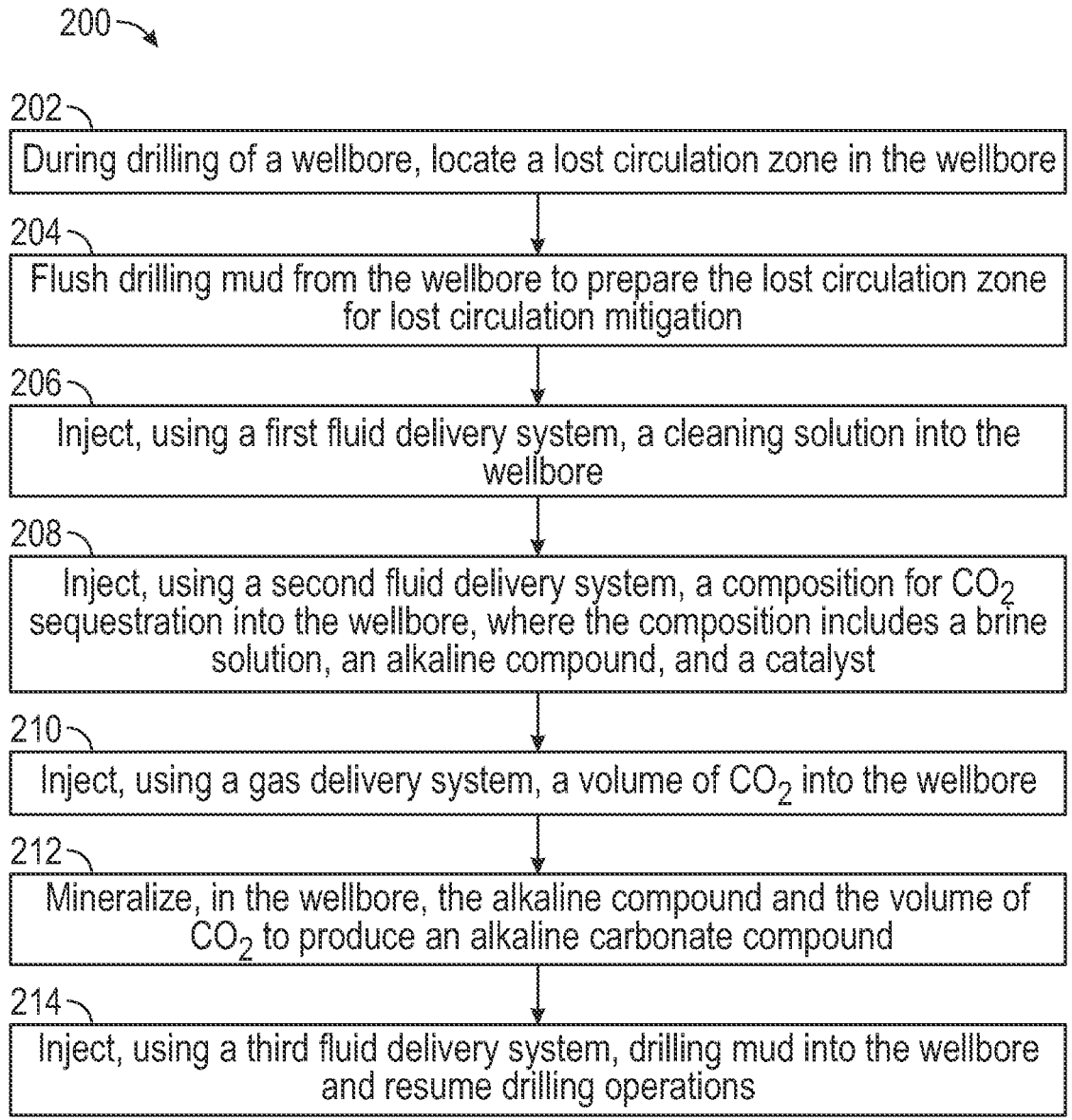

200

202

During drilling of a wellbore, locate a lost circulation zone in the wellbore

204

Flush drilling mud from the wellbore to prepare the lost circulation zone for lost circulation mitigation

206

Inject, using a first fluid delivery system, a cleaning solution into the wellbore

208

Inject, using a second fluid delivery system, a composition for $CO_2$ sequestration into the wellbore, where the composition includes a brine solution, an alkaline compound, and a catalyst

210

Inject, using a gas delivery system, a volume of $CO_2$ into the wellbore

212

Mineralize, in the wellbore, the alkaline compound and the volume of $CO_2$ to produce an alkaline carbonate compound

214

Inject, using a third fluid delivery system, drilling mud into the wellbore and resume drilling operations

FIG. 2

LOST CIRCULATION MITIGATION USING MINERALIZATION OF CO$_2$ IN THE SUBSURFACE

BACKGROUND

Every energy transition scenario requires carbon capture, utilization, and storage (CCUS). Between 1970 and 2000, total carbon dioxide (CO$_2$) emission rose by 0.3 gross tonnage (GT) CO$_2$ per year and accelerated from 2000 to 0.7 GT CO$_2$ per year, increasing atmospheric CO$_2$ concentrations to record high of 418 ppm. The atmospheric rise in CO$_2$ levels is mostly the result of fossil-fuel consumption in heating/cooling, power generation, transport, and industry. CCUS is an emission reduction technology that can be applied across the energy system. CCUS involves the capture of CO$_2$ from fuel combustion or industrial processes, the transport of CO$_2$ via ship or pipeline, and use of CO$_2$ as a resource to create valuable products or services or its permanent storage in deep underground geological formations.

Additionally, a common problem during well drilling operations occurs when annular fluid flow is significantly reduced or completely lost when a fluid is pumped through the drill string and is referred to as lost circulation. Lost circulation can be initiated by either natural or induced causes. Natural causes include encounters with naturally fractured or unconsolidated formations. Induced losses occur when the hydrostatic fluid pressure (the pressure exerted by the drilling mud on the walls of the well) exceeds the fracture gradient of the formation (the maximum pressure after which the formation breaks) and the formation pores break down enough to receive rather than resist the fluid. Lost circulation may cause significant setbacks in well drilling operations and add substantially to the overall cost and time of a well. Previous conventional methods involve reducing drilling fluid density, adding lost circulation material (LCM) to the drilling fluid and/or pumping LCM pill. Most of the previous methods involve injection of additional chemical to mitigate the lost circulation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for carbon dioxide (CO$_2$) sequestration in a wellbore, including, during drilling of a wellbore, locating a lost circulation zone in the wellbore and flushing drilling mud from the wellbore to prepare the lost circulation zone for lost circulation mitigation. The method also includes injecting, using a first fluid delivery system, a cleaning solution into the wellbore and injecting, using a second fluid delivery system, a composition for CO$_2$ sequestration into the wellbore. The composition for CO$_2$ sequestration includes a brine solution, an alkaline compound, and a catalyst. The method further includes injecting, using a gas delivery system, a volume of CO$_2$ into the wellbore and mineralizing, in the wellbore, the alkaline compound and the volume of CO$_2$ to produce an alkaline carbonate compound. The method also includes injecting, using a third fluid delivery system, drilling mud into the wellbore, and resuming drilling operations.

In another aspect embodiments disclosed herein also relate to a method for carbon dioxide (CO$_2$) sequestration in a wellbore, including, during drilling of a wellbore, locating a lost circulation zone in the wellbore and flushing drilling mud from the wellbore to prepare the lost circulation zone for lost circulation mitigation. The method also includes injecting a cleaning solution into the wellbore, injecting a composition for CO$_2$ sequestration into the wellbore. The composition for CO$_2$ sequestration includes a brine solution, an alkali and/or an alkaline compound, and a catalyst. The method further includes injecting a volume of CO$_2$ into the wellbore and mineralizing the alkali and/or the alkaline compound and the volume of CO$_2$ to produce an alkali and/or alkaline carbonate compound. The method also includes injecting drilling mud into the wellbore and resuming drilling operations.

Other aspects and advantages of the claimed subject matter will be apparent from the following description and the appended claims.

BRIEF DESCRIPTION OF DRAWINGS

FIG. 2 is a flowchart of a method according to one or more embodiments.

DETAILED DESCRIPTION

Although there are many types of lost circulation mitigation techniques, embodiments disclosed herein propose a method for mineralizing significant amounts of CO$_2$ in a lost circulation zone. The proposed method therefore has the benefit of mitigating losses of drilling mud and pressure during drilling operations and providing a permanent solution to CO$_2$ sequestration and storage. There are many variations of subsurface sequestration options, one of which is sequestration of CO$_2$ in the form of minerals, for example, calcium carbonate and magnesium carbonate which may be formed in a downhole environment. Mineralization of CO$_2$ in a wellbore provides a permanent solution to storing CO$_2$ and may simultaneously be used to mitigate lost circulation in the wellbore environment.

Embodiments disclosed herein relate to systems and methods for CO$_2$ sequestration in a wellbore. The system disclosed herein may include an oil and gas well, a plurality of fluid delivery systems, and a gas delivery system.

Figure 1:
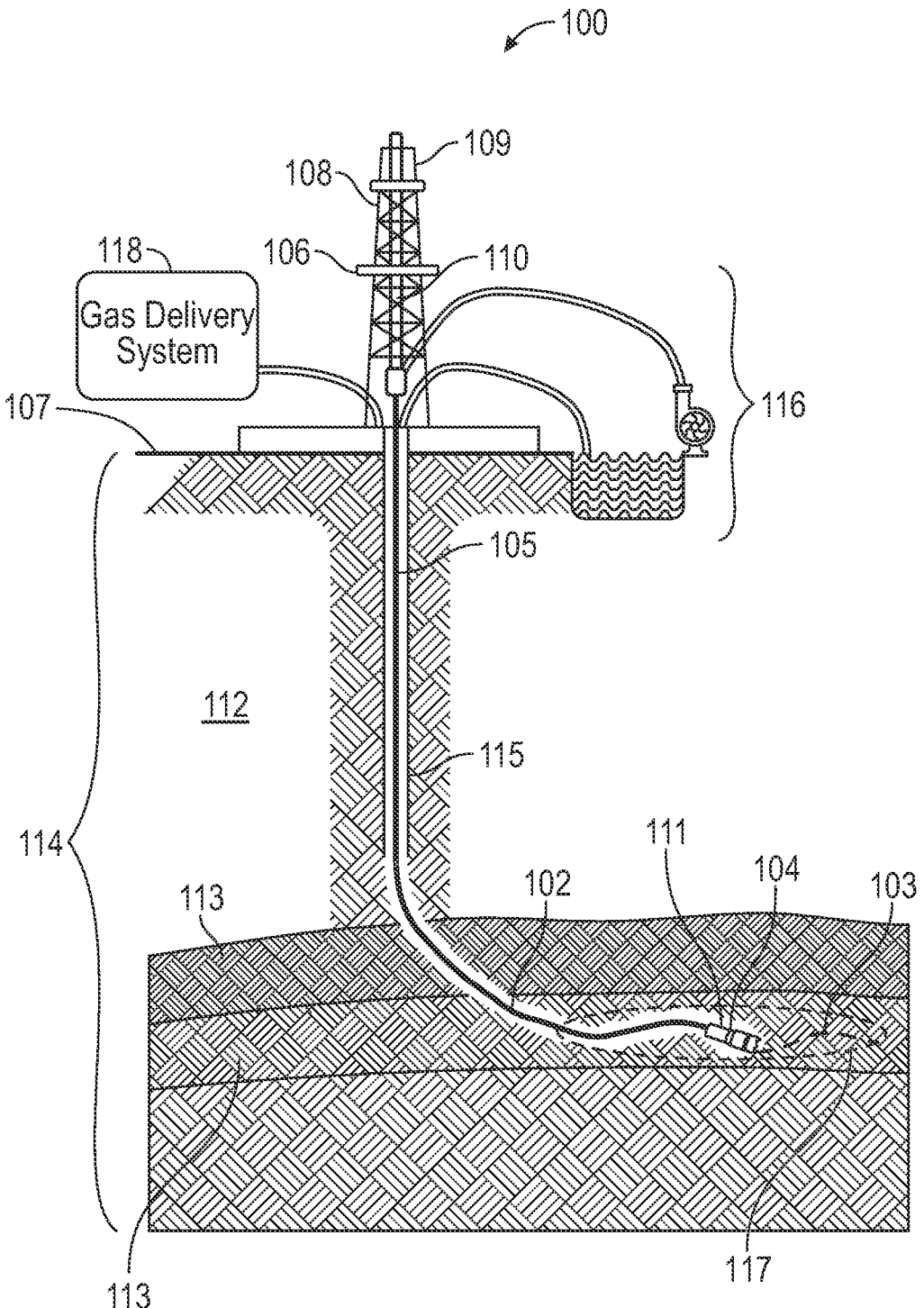
FIG. 1 is a system according to one or more embodiments.

FIG. 1 shows a system 100 in accordance with one or more embodiments. The system 100 may be used to drill a wellbore along a planned wellbore path to access and produce a hydrocarbon reservoir 101. As shown in FIG. 1, a wellbore 102 following a wellbore trajectory 103 may be drilled by a drill bit 104 attached by a drill string 105 to a drill rig 106 located on the surface 107 of the earth. The drill rig 106 may include framework, such as a derrick 108 to hold drilling machinery. A top drive 109 sits at the top of the derrick 108 and provides clockwise torque via the drive shaft 110 to the drill string 105 in order to drill the wellbore 102. The drill string 105 may comprise a plurality of sections of drill pipe attached at the up-hole end to the drive shaft 110 and downhole to a bottom-hole assembly (BHA) 111. The BHA 111 may be composed of a plurality of sections of heavier drill pipe and one or more measurement-while-drilling (MWD) tools configured to measure drilling parameters, such as torque, weight-on-bit, drilling direction, temperature, etc., and one or more logging-while-drilling (LWD) tools configured to measure parameters of the rock surrounding the wellbore 102, such as electrical resistivity, density, sonic propagation velocities, gamma-ray emission, etc.

The wellbore 102 may traverse a plurality of overburden 112 layers and one or more cap-rock 113 layers to a hydrocarbon reservoir 101 within the subterranean region 114, and specifically to a drilling target 117 within the hydrocarbon reservoir 101. The wellbore trajectory 103 may be a curved or a straight trajectory. All or part of the wellbore trajectory 103 may be vertical, and some wellbore trajectory 103 may be deviated or have horizontal sections. One or more portions of the wellbore 102 may be cased with casing 115 in accordance with the wellbore plan.

To start drilling, or "spudding in" the well, the hoisting system lowers the drill string 105 suspended from the derrick 108 towards the planned surface location of the wellbore. An engine, such as a diesel engine, may be used to supply power to the top drive 109 to rotate the drill string 105. The weight of the drill string 105 combined with the rotational motion enables the drill bit 104 to bore the wellbore.

The near-surface is typically made up of loose or soft sediment or rock, so large diameter casing 115, e.g., "base pipe" or "conductor casing," is often put in place while drilling to stabilize and isolate the wellbore. At the top of the base pipe is the wellhead, which serves to provide pressure control through a series of spools, valves, or adapters. Once near-surface drilling has begun, water or drill fluid may be used to force the base pipe into place using a pumping system until the wellhead is situated just above the surface 107 of the earth.

Drilling may continue without any casing 115 once deeper, or more compact rock is reached. While drilling, a fluid delivery system 116 may be fluidly connected to the wellbore and may pump fluids, for example drilling mud, from a mud tank on the surface 107 through the drill pipe and into the wellbore 102. Drilling mud serves various purposes, including pressure equalization, removal of rock cuttings, and drill bit cooling and lubrication. In some embodiments, the fluid delivery system may be used to pump drilling mud into the wellbore. In some embodiments, if the wellbore is equipped with coil tubing, the coil tubing may be used as the fluid delivery system in which case the drilling mud (and other fluids) may be pumped down the coil tubing string.

During the drilling process, lost circulation zones may be encountered. Systems and methods according to embodiments disclosed herein, rather than simply plugging the lost circulation zones with conventional solids used in lost circulation pills, advantageously sequester $CO_2$ in the lost circulation zone of a wellbore while simultaneously mitigating the lost circulation. Systems and methods of one or more embodiments may have very low energy intensity, can be a substitute for the conventional lost circulation mitigation techniques, and may provide significant improvement in carbon footprint. Systems and methods described herein may be low capital and less energy intensive methods to store the $CO_2$ in minerals in the lost circulation zone of the reservoir.

In one or more embodiments, the method for $CO_2$ sequestration in lost circulation zones of a wellbore includes locating, in the wellbore, a lost circulation zone or zones. A lost circulation zone may be identified by any method known in the art including, but not limited to methods in the categories of geomechanical analysis method, machine learning prediction method, and instrument measurement method. A geomechanical analysis method includes analysis of pre-drilling and real-time geomechanical data to predict and identify the possible location of a lost circulation zone. A machine learning method uses a machine learning model to predict lost circulation zones based on information from similar wells. An instrument measurement method includes using logging instruments such as temperature, pressure, and resistivity measurement devices, radioactive tracers, and the like to detect a change in collected data at a downhole position which may indicate a loss circulation zone. In some embodiments, the method includes identifying a lost circulation zone based on drilling mud loss data and pressure history.

Upon locating the lost circulation zone or zones, in one or more embodiments, the method for $CO_2$ sequestration in lost circulation zones of a wellbore also includes preparing the wellbore for lost circulation mitigation. In one or more embodiments, preparing the wellbore for lost circulation mitigation includes flushing drilling mud from the wellbore.

In one or more embodiments, the method for $CO_2$ sequestration in lost circulation zones of a wellbore also includes injecting, using the fluid delivery system, a cleaning solution into the wellbore to flush and clean the wellbore. The cleaning solution according to one or more embodiments may be a brine. In some embodiments, the cleaning solution may have the same composition as the composition for $CO_2$ sequestration, except the cleaning solution does not include a catalyst. The composition for $CO_2$ sequestration of one or more embodiments will be described in more detail in the following paragraphs.

In one or more embodiments, the method for $CO_2$ sequestration in lost circulation zones of a wellbore further includes injecting, using the fluid delivery system, a composition for $CO_2$ sequestration in a wellbore. The composition for $CO_2$ sequestration in a wellbore of one or more embodiments includes a brine solution, an alkaline compound, and a catalyst. As will be appreciated by one of ordinary skill in the art, other components may be included in the composition for $CO_2$ sequestration and therefore, the components listed are not to be taken as limiting.

In one or more embodiments, the brine solution may have a TDS content of from about 100 ppm to about 300,000 ppm. For example, the TDS of the brine solution may be in a range having a lower limit of about 100 ppm, 1000 ppm, 10,000 ppm to an upper limit of about 50,000 ppm, 100,000 ppm, 200,000 ppm and 300,000 ppm, where any lower limit may be paired with any upper limit.

In one or more embodiments, the alkaline compound may include a single alkaline compound, where the alkaline compound contains an alkaline metal selected from Group II of the Periodic Table of Elements or an alkali metal compound selected from Group I of the Periodic Table of Elements. In some embodiments, the alkaline compound may include a mixture of alkaline and/or alkali compounds, where the alkaline compound contains an alkaline metal selected from Group II of the Periodic Table of Elements and/or an alkali metal selected from Group I of the Periodic Table of Elements. In one or more embodiments, the alkaline compound may by selected from the group consisting of hydroxides, carbonates, and the like. Depending on the source of the alkaline compound, other components may be found in the alkaline compound material. The alkaline source may be a pure alkaline compound, such as pure or essentially pure calcium hydroxide for example, or may originate from waste sources, including but not limited to cement kiln dust from a cement plant or a slag from the blast furnace of a steel plant.

In one or more embodiments, the alkaline compound includes a mixture of alkaline metals calcium and magnesium, and the alkaline compound may include calcium hydroxide and magnesium hydroxide. In some embodiments, the weight ratio of calcium hydroxide to magnesium hydroxide may be in a range of from about 0.01 to 1.0. For example, the weight ratio of calcium hydroxide to magnesium hydroxide may be in a range having a lower limit of from 0.01, 0.10, 0.20, 0.50, and 0.70 to an upper limit of 0.75, 0.80, and 1.0, where any lower limit may be paired with any upper limit.

In one or more embodiments, the amount of alkaline compound in the composition may be in a range of from about 1.0 wt. % to about 20 wt. %. For example, the amount of alkaline compound in the composition may be in a range having a lower limit of about 1.0 wt. %, 5 wt. %, and 7.5 wt. % to an upper limit of about 10 wt. %, 15 wt. %, and 20 wt. %, where any lower limit may be paired with any upper limit.

The catalyst of one or more embodiments may be any suitable catalyst known in the art. In some embodiments, the catalyst may be a metal catalyst. The metal catalyst may include metals such as nickel, zinc, arsenic, copper, molybdenum, and cobalt, or combinations therein. The metal may be contained in any transition state or any compositional form, for example the metal catalyst may be a carbonate, a hydroxide, an oxide, a salt, or any other compound known in the art.

In one or more embodiments, the catalyst may be an enzyme. Examples of suitable enzymes include carbonic anhydrase or any other enzyme capable of mineralizing $CO_2$ known in the art.

In one or more embodiments, the composition may include about 0.1% to about 5.0% by weight of the catalyst. For example, the amount of catalyst in the composition may be in a range having a lower limit of about 0.1 wt. %, 0.5 wt. %, and 1 wt. % to an upper limit of about 2.0 wt. %, 3.0 wt. %, and 5.0 wt. %, where any lower limit may be paired with any upper limit.

In one or more embodiments, the pH of the composition may be in a range of from about 8.0 to about 14.0. For example, the pH of the composition may be in a range having a lower limit of about 8.0, 9.0, and 10.0 to an upper limit of about 11.0, 13.0, and 14.0, where any lower limit may be paired with any upper limit.

Returning to FIG. 1, the fluids provided by the fluid delivery system 116 may include, but are not limited to a cleaning solution, a composition for $CO_2$ sequestration, a drilling mud, and the like and the method of one or more embodiments may be applied to any suitable wellbore 102, including, but not limited to, a sandstone or a shale reservoir. The wellbore 102 of one or more embodiments may be a vertical or horizontal well, or any other well known in the art.

In one or more embodiments, the fluid delivery system 116 may include a plurality of fluid delivery systems configured to inject a fluid or a plurality of fluids to the wellbore 102. The fluids provided by the plurality of fluid delivery systems may include any of the fluids previously described.

In one or more embodiments, a first fluid delivery system is configured to inject a cleaning solution into a wellbore, a second fluid delivery system is configured to inject a composition for $CO_2$ sequestration into the wellbore, a third fluid delivery system is configured to pump a drilling mud into the wellbore while drilling.

In one or more embodiments, the system 100 includes a gas delivery system 118. The gas delivery system 118 may be fluidly connected to the wellbore 102 and may provide a gas or gases to the wellbore 102, for example, by injecting a gas or gases into the wellbore 102. The gas provided by the gas delivery system 118 may include, but is not limited to, $CO_2$.

Turning back to the method for $CO_2$ sequestration in lost circulations zones of a wellbore, in one or more embodiments, the method also includes injecting, using the gas delivery system, a volume of $CO_2$ into the wellbore. In one or more embodiments, the volume of $CO_2$ injected into the wellbore using the gas delivery system 118 may be sufficient to completely mineralize the alkaline compound in the composition for $CO_2$ sequestration in a wellbore.

The method of one or more embodiments may also include mineralizing, in the wellbore, the alkaline compound with injected $CO_2$ to produce an alkaline carbonate compound, thereby sequestering $CO_2$ and mitigating lost circulation. In one or more embodiments, the alkaline carbonate compound fills the lost circulation zone and provides permanent sequestration of the volume of $CO_2$ in the wellbore.

At planned depth intervals, or during lost circulation mitigation using, for example, the method described above, drilling may be paused. To case a wellbore, the drill string 105 is withdrawn from the wellbore and sections of casing 115 may be connected and inserted and cemented into the wellbore. Casing string may be cemented in place by pumping cement and mud, separated by a "cementing plug," from the surface 107 through the drill pipe. The cementing plug and drilling mud force the cement through the drill pipe and into the annular space between the casing and the wellbore wall. Once the cement cures, drilling may recommence. The drilling process is often performed in several stages. Therefore, the drilling and casing cycle may be repeated more than once, depending on the depth of the wellbore and the pressure on the wellbore walls from surrounding rock.

Due to the high pressures experienced by deep wellbores, a blowout preventer (BOP) may be installed at the wellhead to protect the rig and environment from unplanned oil or gas releases. As the wellbore becomes deeper, both successively smaller drill bits and casing string may be used. Drilling deviated or horizontal wellbores may require specialized drill bits or drill assemblies.

When the drilling process is resumed after casing, cementing and/or lost circulation mitigation, drilling operations may be resumed by pumping drilling mud down the drill string 105 using the fluid delivery system 116. In some cases, additional lost circulation zones may be encountered after drilling resumes. Thus, the method for $CO_2$ sequestration in lost circulations zones of a wellbore further includes resuming drilling operations by pumping drilling mud into the wellbore using the fluid delivery system. The method also includes identifying additional lost circulation zones upon resumption of drilling operations, injecting, using the fluid delivery system, the composition for $CO_2$ sequestration into the wellbore, injecting, using the gas delivery system, a volume of $CO_2$ into the wellbore, and mineralizing the alkaline compound in the composition for $CO_2$ sequestration and the volume of $CO_2$ to produce an alkaline carbonate compound. In summary, the method may be repeated until all lost circulation zones encountered during the drilling process are mitigated and drilling operations are complete.

A drilling system 100 may be disposed at and communicate with other systems in the well environment. The drilling system 100 may control at least a portion of a drilling operation by providing controls to various components of the drilling operation. In one or more embodiments, the system may receive data from one or more sensors arranged to measure controllable parameters of the drilling operation. As a non-limiting example, sensors may be arranged to measure weight-on-bit, drill rotational speed, flow rate of the mud pumps and rate of penetration of the drilling operation. Each sensor may be positioned or configured to measure a desired physical stimulus. Drilling may be considered complete when a drilling target 117 is reached, or the presence of hydrocarbons is established.

FIG. 2 shows a flowchart illustrating the method 200 of one or more embodiments. The method of one or more embodiments may include, in step 202, during drilling of a wellbore, locating a lost circulation zone in the wellbore.

In step 204, the method includes flushing drilling mud from the wellbore to prepare the lost circulation zone for lost circulation mitigation.

The method also includes, in step 206, injecting, using a first fluid delivery system, a cleaning solution into the wellbore.

The method 200 of one or more embodiments also includes, in step 208, injecting, using a second fluid delivery system, a composition for $CO_2$ sequestration into the wellbore, where the composition includes a brine solution, an alkaline compound, and a catalyst. In some embodiments, the alkaline compound is a mixture of alkaline compounds, for example, calcium hydroxide and magnesium hydroxide. In some embodiments, the catalyst is a metal catalyst, for example nickel, cobalt, or combinations thereof. In some embodiments, the catalyst is an enzyme.

The method 200 of one or more embodiments further includes, in step 210, injecting, using a gas delivery system, a volume of $CO_2$ into the wellbore.

The method 200 of one or more embodiments further includes, in step 212, mineralizing, in the wellbore, the alkaline compound with injected $CO_2$ to produce an alkaline carbonate compound, thereby sequestering $CO_2$ and mitigating lost circulation. In some embodiments, the volume of $CO_2$ completely mineralizes the alkaline compound in the composition for $CO_2$ sequestration in the wellbore.

In one or more embodiments, the method 200 of one or more embodiments also includes, in step 214, injecting, using a third fluid delivery system, drilling mud into the wellbore and resuming drilling operations.

Figure 3:
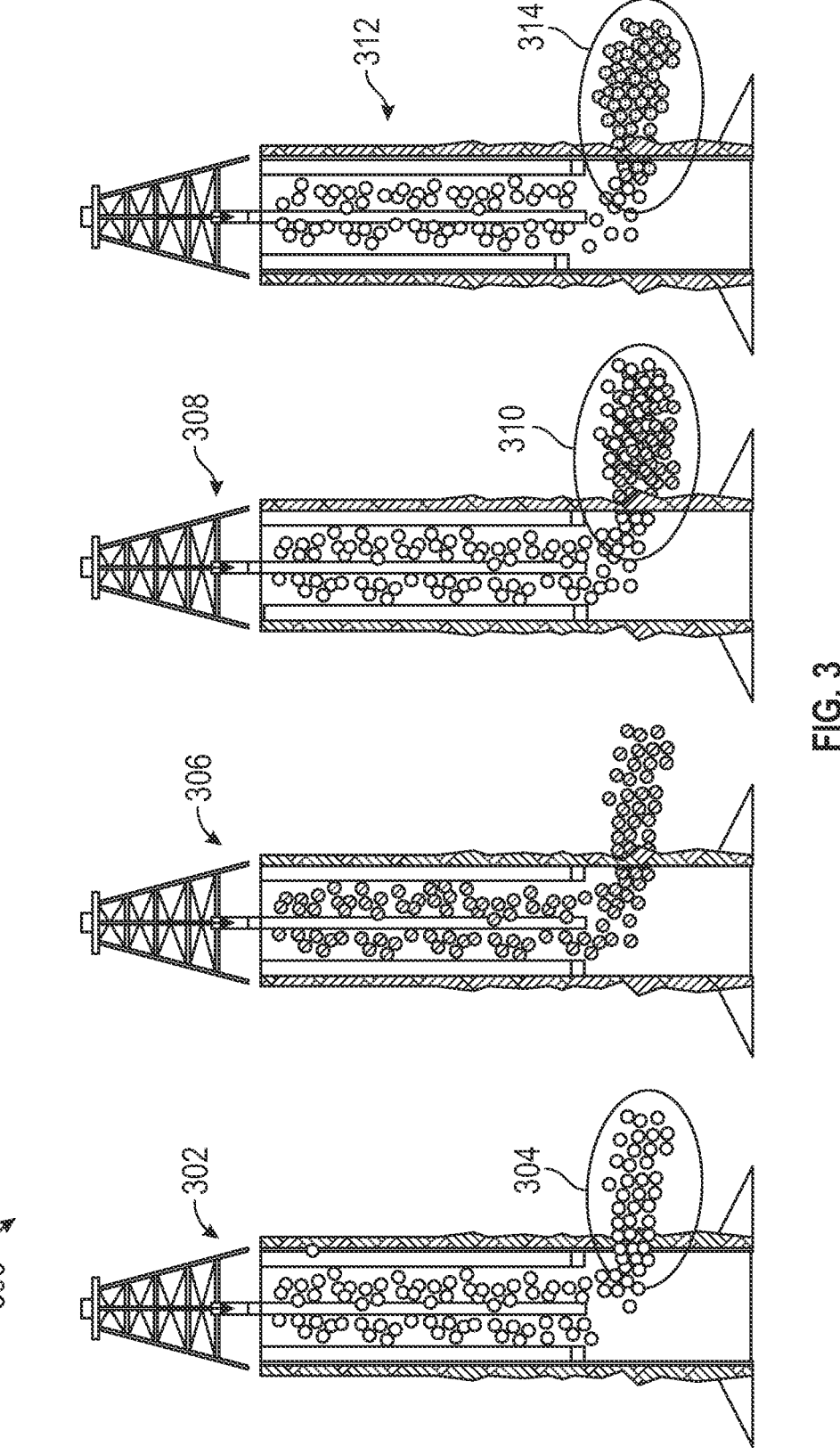
FIG. 3 is a visual representation of a method according to one or more embodiments.

FIG. 3 is a visual representation of a method according to one or more embodiments disclosed herein. In FIG. 3, the method 300 includes, in step 302, injecting a drilling mud into a wellbore during drilling operations, and encountering a lost circulation zone 304. In step 306, inject a composition for $CO_2$ sequestration including a brine solution, an alkaline compound, and a catalyst. In step 308, inject a volume of $CO_2$ and mineralize in the lost circulation zone 310 the volume of $CO_2$ with the composition for $CO_2$ sequestration. In step 312, lost circulation is mitigated as mineralized $CO_2$ 314 accumulates in the lost circulation zones.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method for carbon dioxide ($CO_2$) sequestration in a wellbore, comprising:
    during drilling of a wellbore, locating a lost circulation zone in the wellbore;
    flushing drilling mud from the wellbore to prepare the lost circulation zone for lost circulation mitigation;

injecting, using a first fluid delivery system, a cleaning solution into the wellbore;
    injecting, using a second fluid delivery system, a composition for $CO_2$ sequestration into the wellbore, wherein the composition for $CO_2$ sequestration comprises;
      a brine solution,
      an alkaline compound, and
      from 0.1% to 5.0% by weight of a catalyst comprising an enzyme or a metal selected from the group consisting of nickel, zinc, arsenic, copper, molybdenum, cobalt, and combinations thereof;
    injecting, using a gas delivery system, a volume of $CO_2$ into the wellbore;
    mineralizing, in the wellbore, the alkaline compound and the volume of $CO_2$ to produce an alkaline carbonate compound; and
    injecting, using a third fluid delivery system, drilling mud into the wellbore, and resuming drilling operations.

2. The method of claim 1, wherein the cleaning solution is a brine solution.

3. The method of claim 1, wherein the alkaline compound comprises calcium hydroxide or magnesium hydroxide.

4. The method of claim 1, wherein the catalyst comprises a metal catalyst selected from the group consisting of nickel, cobalt, and combinations thereof.

5. The method of claim 1, wherein the volume of $CO_2$ completely mineralizes the alkaline compound in the composition.

6. The method of claim 1, wherein the brine solution has a total dissolved solids content of from 100 ppm to 300,000 ppm.

7. The method of claim 1, wherein the alkaline compound comprises calcium hydroxide and magnesium hydroxide.

8. The method of claim 7, wherein a ratio of calcium hydroxide to magnesium hydroxide is 0.01:1 by weight.

9. The method of claim 1, wherein the composition for $CO_2$ sequestration comprises 1.0 wt. % to 20 wt. % by weight of the alkaline compound.

10. The method of claim 1, wherein the composition for $CO_2$ sequestration has a pH in a range of 8.0 to 14.0.

11. A method for carbon dioxide ($CO_2$) sequestration in a wellbore, comprising:
    during drilling of a wellbore, locating a lost circulation zone in the wellbore;
    flushing drilling mud from the wellbore to prepare the lost circulation zone for lost circulation mitigation;
    injecting a cleaning solution into the wellbore;
    injecting a composition for $CO_2$ sequestration into the wellbore, wherein the composition for $CO_2$ sequestration comprises;
      a brine solution,
      an alkali and/or an alkaline compound, and
      from 0.1% to 5.0% by weight of a catalyst comprising an enzyme or a metal selected from the group consisting of nickel, zinc, arsenic, copper, molybdenum, cobalt, and combinations thereof;
    injecting a volume of $CO_2$ into the wellbore;
    mineralizing the alkali and/or the alkaline compound and the volume of $CO_2$ to produce an alkali and/or alkaline carbonate compound; and
    injecting drilling mud into the wellbore and resuming drilling operations.

12. The method of claim 11, wherein the catalyst comprises a metal catalyst selected from the group consisting of nickel, cobalt, and combinations thereof.

13. The method of claim 11, wherein the volume of $CO_2$ completely mineralizes the alkali and/or the alkaline compound in the composition.

14. The method of claim 11, wherein the brine solution has a total dissolved solids content of from 100 ppm to 300,000 ppm.

15. The method of claim 11, wherein the composition for $CO_2$ sequestration comprises 1.0 wt. % to 20 wt. % by weight of the alkali and/or the alkaline compound.

16. The method of claim 11, wherein the composition for $CO_2$ sequestration has a pH in a range of 8.0 to 14.0.

* * * * *